United States Patent [19]

Hwang et al.

[11] Patent Number: 5,492,226

[45] Date of Patent: Feb. 20, 1996

[54] APPARATUS FOR SORTING AND FEEDING BEAD SUPPORTERS FOR AN ELECTRODE GUN OF A CATHODE-RAY TUBE

[75] Inventors: Cheol H. Hwang, Kumi-si; Ki B. Son, Susung-ku, both of Rep. of Korea

[73] Assignee: Goldstar Co., Ltd., Seoul, Rep. of Korea

[21] Appl. No.: 996,603

[22] Filed: Dec. 24, 1992

[30] Foreign Application Priority Data

Dec. 24, 1991 [KR] Rep. of Korea ................. 23815/1991

[51] Int. Cl.$^6$ .............................. H01J 29/46; B07C 9/00; B65G 47/24
[52] U.S. Cl. ..................... 209/695; 198/390; 198/391; 313/313; 313/270; 313/446
[58] Field of Search ................... 313/270, 417, 313/446; 209/697; 198/390, 391

[56] References Cited

U.S. PATENT DOCUMENTS

| | | | |
|---|---|---|---|
| 2,641,727 | 6/1953 | Pohle | 313/270 |
| 2,833,952 | 5/1958 | Hemphill et al. | 313/270 |
| 3,128,407 | 4/1964 | Mattson | 313/270 |
| 3,244,927 | 4/1966 | Drake et al. | 313/270 |
| 3,249,790 | 5/1966 | Schaefer | 313/270 |
| 3,333,138 | 7/1967 | Szegho | 313/270 |
| 3,345,527 | 10/1967 | Atti | 313/270 |
| 4,298,810 | 11/1981 | Dinger et al. | |
| 4,608,646 | 8/1986 | Goodrich et al. | 364/478 |
| 4,909,375 | 3/1990 | Cotic et al. | 198/393 |
| 4,915,209 | 4/1990 | Canziani | 198/357 |

FOREIGN PATENT DOCUMENTS

| | | | | |
|---|---|---|---|---|
| 0243278 | 9/1960 | Australia | | 313/270 |
| 2654554 | 6/1978 | Germany | | 313/270 |

*Primary Examiner*—Sandra L. O'Shea
*Assistant Examiner*—Vip Patel
*Attorney, Agent, or Firm*—Fish & Richardson

[57] ABSTRACT

This invention relates to a bead supporter for supporting a cathode assembly of an electron gun for a cathode-ray tube and fixing the assembly to a bead glass. This invention also relates to an apparatus for sorting and transporting the bead supporters in a properly oriented posture to an assembly line. The bead supporter includes a plurality of positioning projections formed on the lower side of its central portion, and cut-out portions formed in its upper edge portion opposite to the projections to permit the center of gravity of the supporter to vary depending upon its normal and reverse positions. The apparatus includes a feeding surface and a horizontal sorting surface for transferring the bead supporters. The width of the horizontal sorting surface is less than the width of the feeding surface such that each supporter having cut-out portions formed therein falls from the sorting surface when reversely positioned. The apparatus also includes a vertical sorting wall formed perpendicularly to the feeding and horizontal sorting surfaces for guiding the supporters.

3 Claims, 4 Drawing Sheets

APPARATUS FOR SORTING AND FEEDING BEAD SUPPORTERS FOR AN ELECTRODE GUN OF A CATHODE-RAY TUBE

BACKGROUND OF THE INVENTION

1. Field of the Invention

This invention relates to an apparatus for sorting and feeding bead supporters for an electron gun of a cathode-ray tube. More particularly, the invention is an apparatus for sorting and feeding bead supporters to an assembly line in a properly oriented posture suitable for assembly. The bead supporters support a plurality of cathode assemblies for an electron gun and the assemblies to opposing bead glasses.

2. Description of the Prior Art

Generally, an electron gun for a cathode-ray tube is of the type shown in FIG. 1 of the accompanying drawings. The electron gun comprises three equally spaced coplaner cathode assemblies 10 each including a cathode 4, a heater 5 and an eyelet 6. Each cathode assembly is supported by a bead supporter 7. First, second and third grids, 1, 2 and 3, are arranged in order ahead of each cathode assembly and are fixed to opposing bead glasses 14 at predetermined intervals.

Since cut-off voltages in the cathode assemblies are not always equal to one another, bias voltages which differ from one another must be applied to the respective cathode assemblies in order to obtain a constant electric current. Therefore, to obtain a good quality picture image on the screen of the cathode ray tube, it is desirable to make cathode currents of the respective cathode assemblies 10 equal to one another within a short period of time-after commencing operation.

It is desirable that the coplaner cathode assemblies 10 be kept equally spaced from the first grid 1 so as to obtain a good quality picture image. During operation of the electron gun, however, the distance between the first grid 1 and each cathode assembly 10 may vary as the cathode assembly and adjacent structures are heated by the heater 5, thereby adversely affecting the picture image on the screen. More specifically, during operation of the heater 5 of the electron gun, the cathode assembly 10 is heated to a temperature of about 800° C. and the eyelet 6 is heated to a temperature of about 400° C. As a result, the length of the cathode assembly extends from its initial set value by a value of $$\Delta l (\Delta l = \alpha \cdot l \cdot \Delta T)$$

where,

α: thermal expansion coefficient of the cathode assembly;

l: length of the cathode assembly;

ΔT: difference between the normal temperature of the cathode assembly and the temperature of the assembly when heated by the heater.

The centrally located cathode assembly 10 is heated about 20° C. higher than two outer cathode assemblies (not shown), however, due to radiant heat. Therefore, as shown in FIG. 2, the length A of the central cathode assembly 10 becomes longer than the corresponding length of the outer cathode assemblies, resulting in changes in distances between the respective cathode assemblies and the first grid.

In order to compensate for the changes in distances, for example, the head supporter 7 is either made of a material having a thermal expansion coefficient greater than the thermal expansion coefficient of the eyelet 6, or is formed to have an expanded length greater than the expanded length B of the eyelet. In this way variations in the expanded lengths of the central and outer cathode assemblies can be compensated, thereby maintaining equal distances between the first grid and the respective cathode assemblies.

In order to adjust the expanded lengths of the bead supporters 7 and the eyelets 6, the bead supporters are each formed with a plurality of projections 7a to allow the assembling positions of the supporters to the eyelets to be determined. More specifically, to compensate for the expanded lengths of the bead supporters 7, the bead supporters for supporting the outer cathode assemblies have the projections provided along their longitudinal central lines. In contrast, bead supporters for supporting the central cathode assembly have projections formed on a lower portion below a longitudinal central line.

During the assembly process of the electron gun, the bead supporters are transported by an assembly line. The bead supporters for the outer cathode assemblies can be transported without being sorted because each supporter, which has projections arranged along its longitudinal central line, is of a symmetrical configuration. This means that the projections of bead supporters for the outer cathode assemblies will be in the same position regardless of whether the bead supporters are transported in a normal or reverse position. In contrast, the bead supporter 7 for the central cathode assembly 10, which has the projections 7a formed on the lower portion below its longitudinal central line, is of an asymmetrical configuration. This bead supporter must, therefore, be sorted and transported by an apparatus which detects normal and reverse positions, and then transports only a normally positioned supporter to the assembly line.

According to the prior art, when the bead supporters 7 each having the projections 7a formed on the lower portion below its longitudinal central line, as shown in FIG. 5, are transported to the assembly line, they are first supplied from a parts feeder (not shown) to a bead supporter sorting and feeding apparatus. The apparatus comprises a parts feeding pin 8, a position detecting pin 9 and an optical sensor (not shown) positioned at a feed passage for the feed supporters 7, and grippers 13 for temporarily stopping the bead supporter, as shown in FIG. 3.

When the optical sensor detects that the bead supporter 7 has reached a given location for normal position detection, the grippers 13, which are freely movable, are moved to a forward position to temporarily stop the bead supporter. In this state, as shown in FIG. 4, the position detecting pin 9 is extended upwardly from its retracted position below the stopped supporter 7 through a central passage 15 of the supporter to detect the position of the projections 7a on the inner wall of the central passage 15. Through contact with the projections, the bead supporter is recognized as being either in a normal position or a reverse position. When the supporter is in the normal position, it is transferred to the next process for joining with the eyelet. If the bead supporter is in the reverse position, however, it is turned in the reverse direction by a shutter 16, as shown in FIG. 3, and positioned in the normal direction. It is then transferred to the next process.

The prior art apparatus which sorts the bead supporters by detecting the positions of the projections of each supporter has drawbacks, however, in that is complex in construction and results in higher manufacturing costs. Since the projections 7a of the bead supporter are very small, when foreign matter sticks to the projections, or the bead supporter is gripped in a tilted condition, or the extended position detecting pin is tilted even slightly, the position of the supporter may be erroneously detected.

SUMMARY OF THE INVENTION

With the foregoing drawbacks of the prior art apparatus in view, it is an object of the present invention to sort bead supporters for an electron gun of a cathode-ray tube depending upon their normal and reversed positions. In achieving this object only the bead supporters having projections normally positioned will be transported to an assembly line.

To achieve the above object, there is provided according to one aspect of the present invention a bead supporter for supporting a cathode assembly of an electron gun for a cathode ray tube and fixing the assembly to opposing bead glasses. The bead supporter comprises a plurality of positioning projections formed on the lower side of its central portion; and cut-out portions formed in its upper edge opposite to said projections for permitting the center of gravity of the supporter to vary depending upon its normal and reverse positions.

According to another aspect of the present invention, there is provided an apparatus for sorting bead supporters for an electron gun of a cathode-ray tube and for feeding them in a normally oriented posture to an assembly line. The apparatus comprises a feeding surface and a horizontal sorting surface for transferring said bead supporters, wherein the horizontal sorting surface has a width less than the width of the feeding surface such that each bead supporter falls from the sorting surface when reversely positioned; and a vertical sorting wall formed perpendicularly to said feeding and horizontal sorting surfaces for guiding said supporters.

DESCRIPTION OF THE PREFERRED EMBODIMENTS

Figure 1:
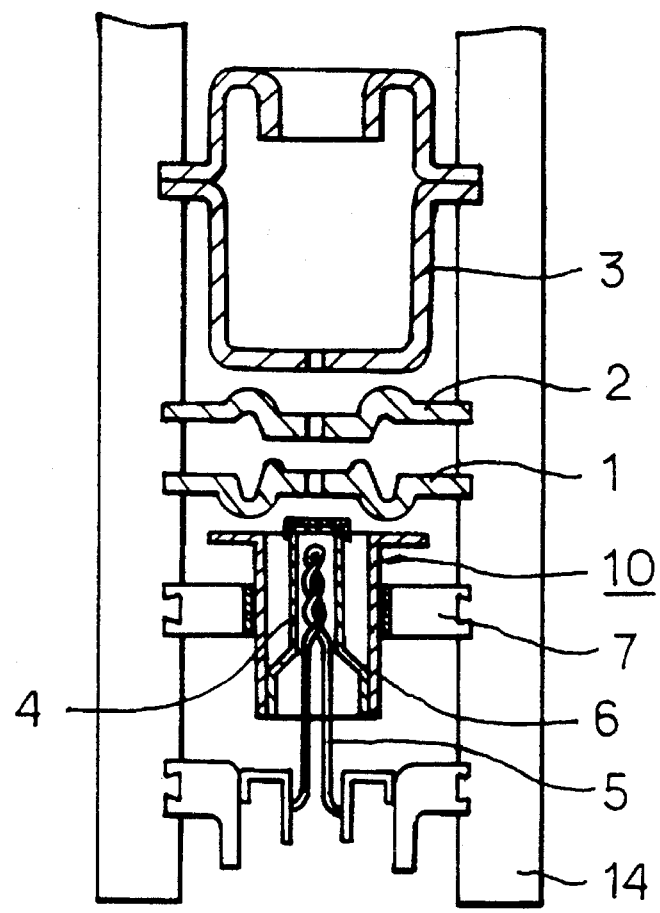
FIG. 1 is a longitudinal cross-sectional view of an electron gun for a conventional cathode-ray tube, taken along the central line of the gun.
Figure 2:
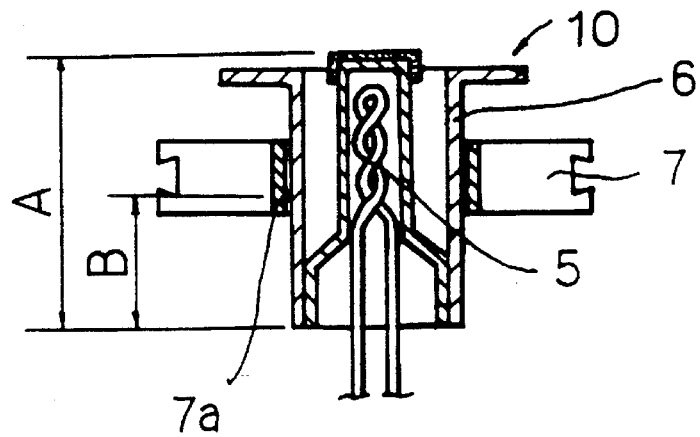
FIG. 2 is a diagrammatic side view showing a cathode assembly and a bead supporter, as shown in FIG. 1.
Figure 3:
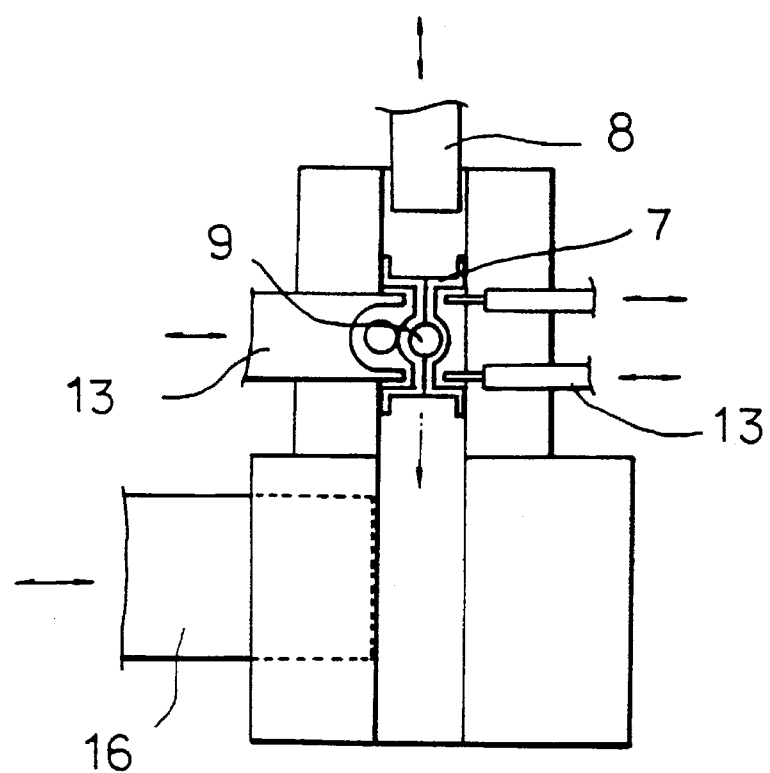
FIG. 3 is a diagrammatic plan view showing a bead supporter sorting and feeding apparatus according to the prior art.
Figure 4:
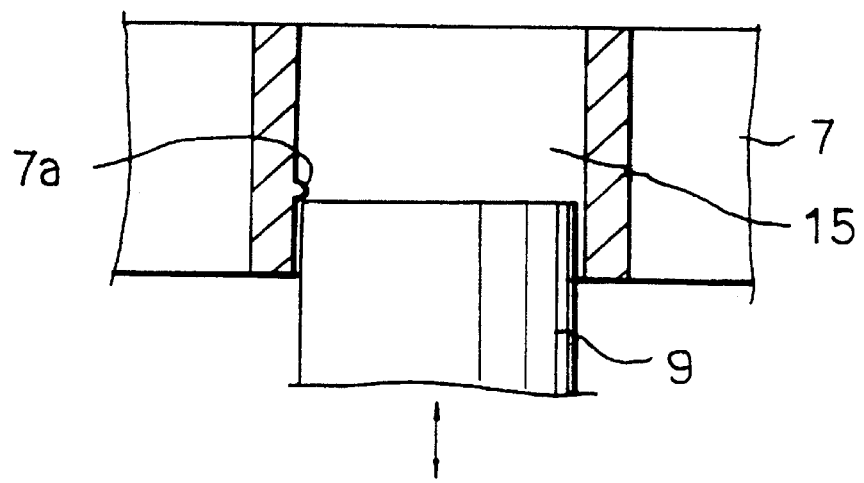
FIG. 4 is a diagrammatic view for explaining the manner of detecting normal and reverse positions of the bead supporter for the central cathode assembly according to the prior art.
Figure 5:
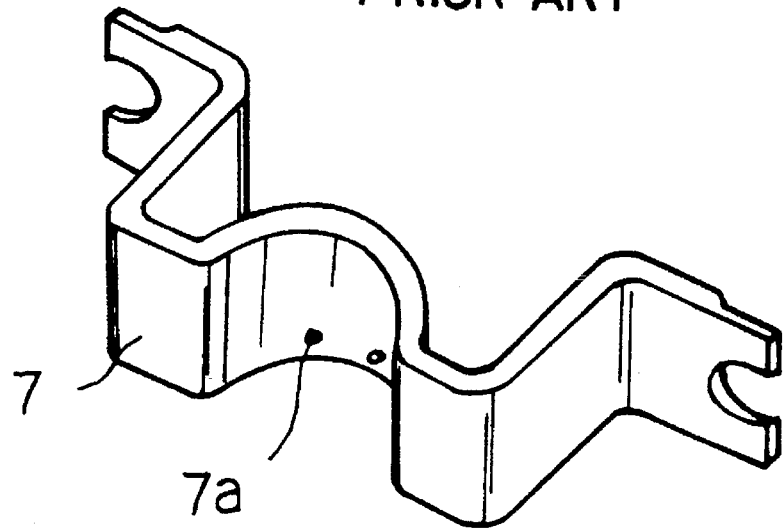
FIG. 5 is a diagrammatic perspective view of the bead supporter of the prior art.
Figure 6:
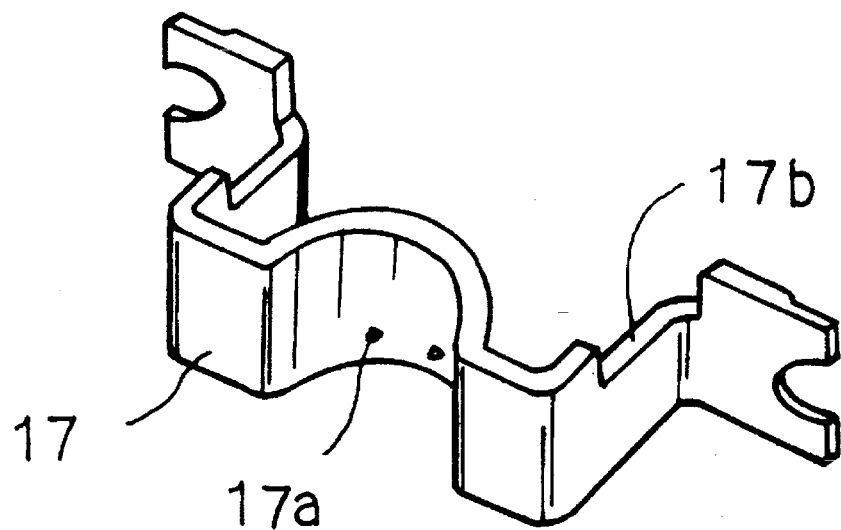
FIG. 6 is a diagrammatic perspective view of a bead supporter according to the present invention.
Figure 7A:
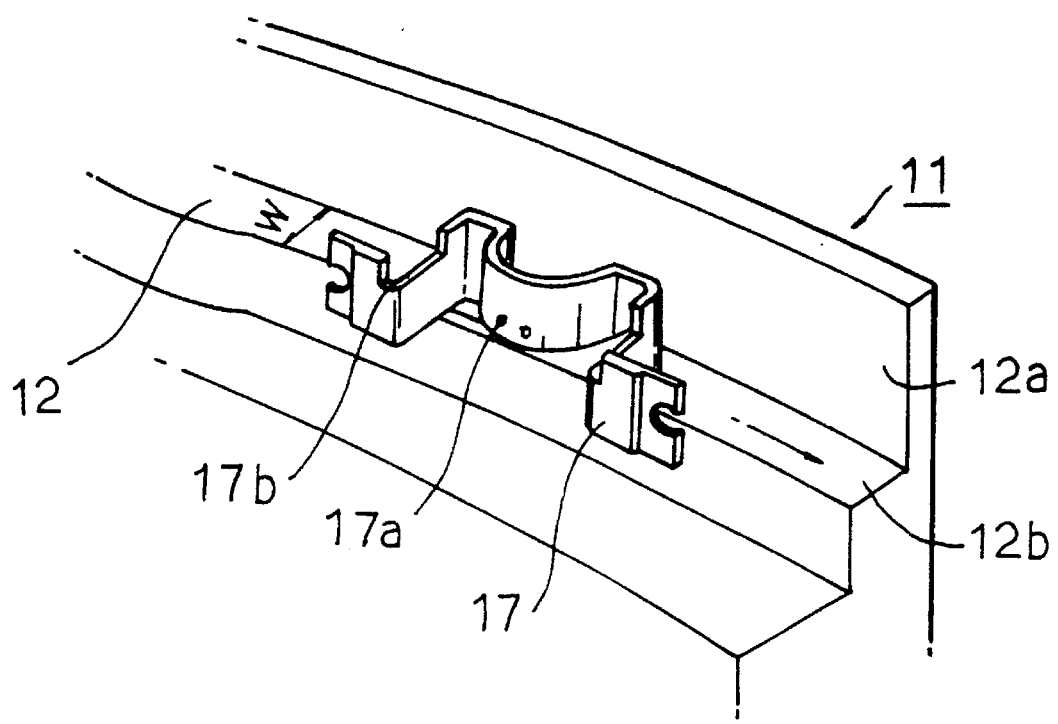
FIG. 7a is a perspective view of a bead supporter sorting and feeding apparatus according to the present invention, showing the feeding state of the normally positioned bead supporter.
Figure 7B:
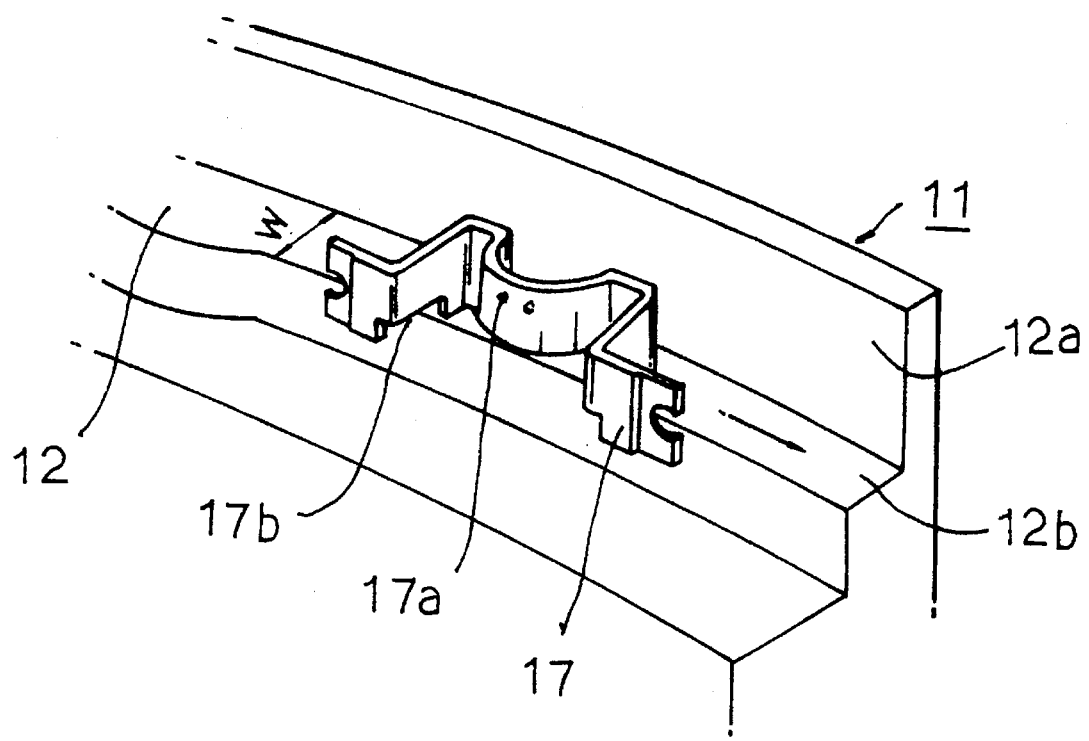
FIG. 7b is a view similar to FIG. 7a, but showing the feeding state of the reversely positioned bead supporter.

The invention will now be described in detail, by way of example, with reference to FIGS. 6, 7a and 7b of the accompanying drawings. FIG. 6 shows a perspective view of a bead supporter according to the present invention. FIGS. 7a and 7b show, respectively, the normally positioned and reversely positioned bead supporters being transported in a bead supporter sorting and feeding apparatus of the present invention.

A cathode assembly which comprises a heater, a cathode an eyelet, and is fixed to a bead glass by the bead supporter, is identical with that of the prior art. Therefore, a detailed description thereof is omitted.

According to one embodiment of the present invention, as shown in FIG. 6, the bead supporter 17 has a pair of projections 17a formed on the lower side of its central portion. A pair of cut-out portions 17b is formed in an upper edge portion opposite to the projections 17a for permitting the center of gravity of the supporter to vary depending upon its normal and reverse positions.

Although the cut-out portions 17a are shown as having a rectangular configuration, they may be of a polygonal or curved shape. In addition, as shown in FIG. 7a, the cut-out portions are formed in the upper edges of the bead supporter 17 opposite to the portions of the supporter which come into contact with a sorting wall of a sorting section which will be explained hereinafter.

According to the present invention, a parts feeder 11 is provided with a sorting section 12 serving to sort the normally and reversely positioned bead supporters by displacing the center of gravity of the supporter, depending upon its normal and reverse positions, such that only the normally positioned supporters are transported to an assembly line. The sorting section 12 comprises a vertical sorting wall 12a for guiding the bead supporters 17 and a horizontal sorting surface 12b formed perpendicularly to the vertical sorting wall 12a to transfer the supporters. A width "w" of the horizontal sorting surface 12b is determined to be less than the width of a feeding surface of the parts feeder 11 such that the normally positioned bead supporter 17 having the cut-out portions 17b facing upwardly, as shown in FIG. 7a, can be fed to the next process without falling from the surface 12b. Reversely positioned bead supporters which have cut-out portions facing downwardly, as shown in FIG. 7b, fall from the parts feeder due to displacement of the center of gravity of the bead supporter.

Operation of the apparatus of the present invention will now be explained below with reference to FIGS. 7a and 7b.

First, the bead supporters 17 are randomly supplied into the parts feeder 11. Then, when the parts feeder is actuated by electric power applied thereto, the supporters 17 are transferred in sequence through the sorting section 12 by a vibrator (not shown).

In the sorting section, the normally positioned bead supporter 17, having the cut-out portions 17b facing upwardly, is normally transferred to the assembly line because the portion of the supporter coming into contact with both the sorting wall 12a and the sorting surface 12b is heavier than the unsupported portion. Therefore, the supporter may be stably supported on the sorting surface, as shown in FIG. 7a.

If bead supporter 17 is positioned in reverse such that the cut-out portions 17b face downwardly, as shown in FIG. 7b, the center of gravity of the supporter is displaced toward the unsupported portion. The supporter then falls freely from the sorting surface onto a lower feeding surface to be turned to the normal position. Then, the supporter is transferred in the normal position to the assembly line. Therefore, the bead supporters are transported in a normal position to the assembly line.

From the foregoing it will be appreciated that the present invention allows only the bead supporters which are normally positioned to be transported to the assembly line by displacing the center of gravity of the bead supporters. The center of gravity can be displaced due to the cut-out portions formed in the upper edge of the bead supporters. A detection error resulting from an abnormal or reversed position of the supporter may be prevented and the parts may be efficiently transported using the simple construction. As a result, a reduction in costs and improvement in productivity can be achieved.

While the invention has been shown and described with particular reference to a preferred embodiment thereof, it will be understood that variations and modifications in form and detail may be made therein without departing from the spirit and scope of the invention as defined in the appended claims.

What is claimed is:

1. An apparatus for sorting bead supporters for an electron gun of a cathode-ray tube, comprising:

a vertical sorting wall;

a horizontal feeding surface formed perpendicularly to said sorting wall for transferring said bead supporters; and a horizontal sorting surface having a width less than a width of the horizontal feeding surface and formed perpendicularly to said sorting wall for sorting said bead supporters, the width of said horizontal feeding surface being such that bead supporters oriented in an incorrect orientation will fall from the sorting surface;

wherein said bead supporter comprises:

a semi-circular central portion for supporting the cathode assembly;

a plurality of positioning projections formed on a lower inward side of the semi-circular central portion of the bead supporter; and a pair of extended portions projecting from said semi-circular central portion, parts of each of the pair of extended portions projecting to positions outward of the semi-circular central portion, for fixing a cathode assembly to opposing bead glasses;

wherein a cut-out portion is formed in an upper edge of at least one extended portion of the bead supporter, said cut-out portion causing said bead supporter to fall from said supporting surface if said bead supporter is incorrectly oriented.

2. The bead supporter of claim 1, wherein cut-out portions are formed in both said extended portions of the bead supporter.

3. The bead supporter of claim 2, wherein said cut-out portions extend on both sides of a vertical plane containing a center of gravity of said bead supporter.

* * * * *